US011528971B2

(12) United States Patent
Lansdorp

(10) Patent No.: US 11,528,971 B2
(45) Date of Patent: Dec. 20, 2022

(54) JEWELRY IMAGE PROJECTION AND METHOD

(71) Applicant: Bob Michael Lansdorp, Goleta, CA (US)

(72) Inventor: Bob Michael Lansdorp, Goleta, CA (US)

(*) Notice: Subject to any disclaimer, the term of this patent is extended or adjusted under 35 U.S.C. 154(b) by 263 days.

(21) Appl. No.: 16/409,794

(22) Filed: May 11, 2019

(65) Prior Publication Data

US 2019/0343249 A1 Nov. 14, 2019

Related U.S. Application Data

(60) Provisional application No. 62/670,836, filed on May 13, 2018.

(51) Int. Cl.
*A44C 27/00* (2006.01)
*A44C 9/00* (2006.01)
*G02B 5/18* (2006.01)

(52) U.S. Cl.
CPC .............. *A44C 27/001* (2013.01); *A44C 9/00* (2013.01); *G02B 5/1842* (2013.01); *G02B 5/1857* (2013.01)

(58) Field of Classification Search
CPC ........ A44C 27/001; A44C 9/00; G02B 5/1842
USPC ........................................................ 359/567
See application file for complete search history.

(56) References Cited

U.S. PATENT DOCUMENTS

| | | | | |
|---|---|---|---|---|
| 4,490,440 A * | 12/1984 | Reber | ..................... | A44C 27/00 29/896.41 |
| 4,604,329 A * | 8/1986 | Reber | ..................... | A44C 27/00 216/2 |
| 4,725,511 A * | 2/1988 | Reber | ..................... | A44C 27/00 29/896.32 |
| 5,217,831 A * | 6/1993 | White | ....................... | G03F 1/28 430/311 |
| 6,433,036 B1 * | 8/2002 | Wojciak | .................... | C08F 2/50 522/18 |
| 6,452,699 B1 * | 9/2002 | Athale | ..................... | G03H 1/18 359/13 |
| 6,605,235 B1 * | 8/2003 | Meyer | ..................... | C09D 5/36 252/299.01 |
| 6,839,173 B2 * | 1/2005 | Shimmo | .............. | G02B 5/1861 359/569 |
| 8,233,218 B1 * | 7/2012 | Mossberg | ............ | G02B 5/1842 359/567 |
| 8,270,079 B1 * | 9/2012 | Mossberg | .......... | G02B 27/4272 359/567 |
| 8,314,989 B1 * | 11/2012 | Mossberg | ............ | G02B 5/1819 359/567 |
| 10,473,834 B2 * | 11/2019 | Channon | ............... | G02B 5/1847 |
| 2004/0021945 A1 * | 2/2004 | Tompkin | .................. | G02B 5/18 359/566 |
| 2004/0196556 A1 * | 10/2004 | Cappiello | ............. | G01J 3/0286 359/569 |
| 2007/0146884 A1 * | 6/2007 | Shiozaki | .............. | G02B 5/1857 359/565 |

(Continued)

*Primary Examiner* — Collin X Beatty

(57) ABSTRACT

An article of jewelry comprising; a frame; and a decorative element secured within the frame, wherein two-dimensional array of optical phase shifting structures is embedded in the decorative element; wherein the two-dimensional array of optical phase shifting structures project an image when illuminated with a light source.

6 Claims, 8 Drawing Sheets

(56) References Cited

U.S. PATENT DOCUMENTS

| | | | |
|---|---|---|---|
| 2007/0157667 A1* | 7/2007 | Maltezos | A44C 17/00 63/32 |
| 2009/0081425 A1* | 3/2009 | Nakajima | B24B 9/16 428/209 |
| 2010/0181706 A1* | 7/2010 | Ruuttu | B23K 26/0624 264/400 |

* cited by examiner

JEWELRY IMAGE PROJECTION AND METHOD

CROSS-REFERENCE TO RELATED APPLICATIONS

This application is a continuation of U.S. application No. 62/670,836 filed May 13, 2018. The disclosure of the prior applications is considered part of (and is incorporated by reference in) the disclosure of this application.

BACKGROUND OF THE INVENTION

The present invention relates to device for image projection, and more particularly to an article of jewelry with an image embedded in the article of jewelry which when illuminated projects an image.

Precious stones have been used as gifts and stores of value. Diamonds are commonly used in engagement rings due to the high hardness and stability. Furthermore, each diamond is thought to be unique and therefore has symbolic value, for example for couples that are preparing for marriage.

However, the environmental impact of diamond mining, and the social conflicts caused by the pursuit of the stones has led to great hardships, particularly in the developing world due to exploitation of workers and devastation of the environment. Furthermore, the cost of diamonds to the end consumer has reached exorbitant values.

Therefore, there exists a need for a highly personalized piece of jewelry that does not have the negative environmental impact of conflict diamonds.

SUMMARY

In a first embodiment, the present invention is an article of jewelry comprising:
a frame; and a decorative element secured within the frame, wherein an image is embedded in the decorative element; wherein the embedded image is a two-dimensional array of optical phase shifting structures.

In a second embodiment, the present invention is a method of creating a jewelry article that can project an image, comprising: creating a two-dimensional phase-mask; etching the two-dimensional phase mask on a decorative element; securing the decorative element within a frame; shining a light source at the decorative element, wherein an image is projected, for example onto a surface.

In a third embodiment, the present invention is a method of etching a decorative element, comprising: creating a two dimensional image, digitally rendering the two dimensional image; converting the digital image to a digital phase mask; converting the digital phase mask to a physical phase mask; and etching the physical phase mask onto a decorative element.

DETAILED DESCRIPTION OF THE INVENTION

Figure 1:
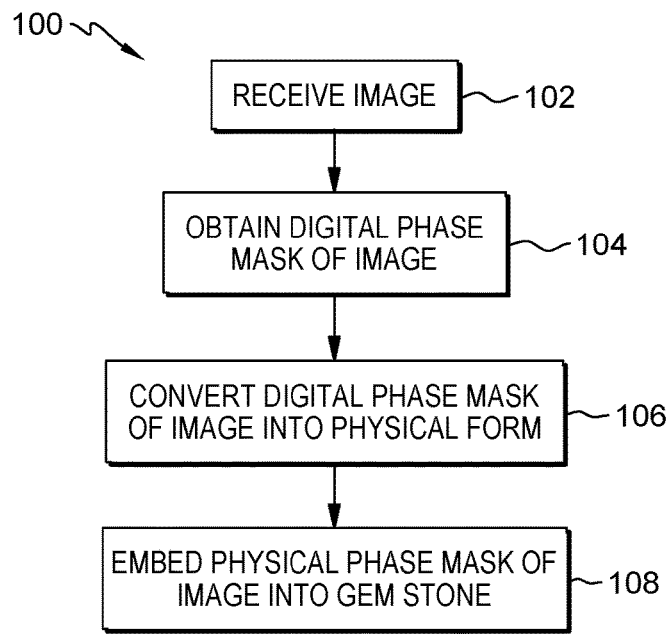
FIG. 1 depicts a flow chart of the method to embed the image in a gemstone, in accordance with one embodiment of the present invention.

The present invention provides for a method of embedding an image into a gemstone, so when a light source is held within close proximity to the stone, the image is projected, for example onto a surface. The present invention provides the advantage of allowing a large variety of images (or words) to be projected from a gemstone by etching a phase mask into the gemstone, then with the use of a light source shining through the phase mask, the image is projected onto a surface. This process involves taking the image, creating a digital rendering of the image, from the digital image creating a phase mask of the digital image, and etching that phase mask into the stone.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 4:
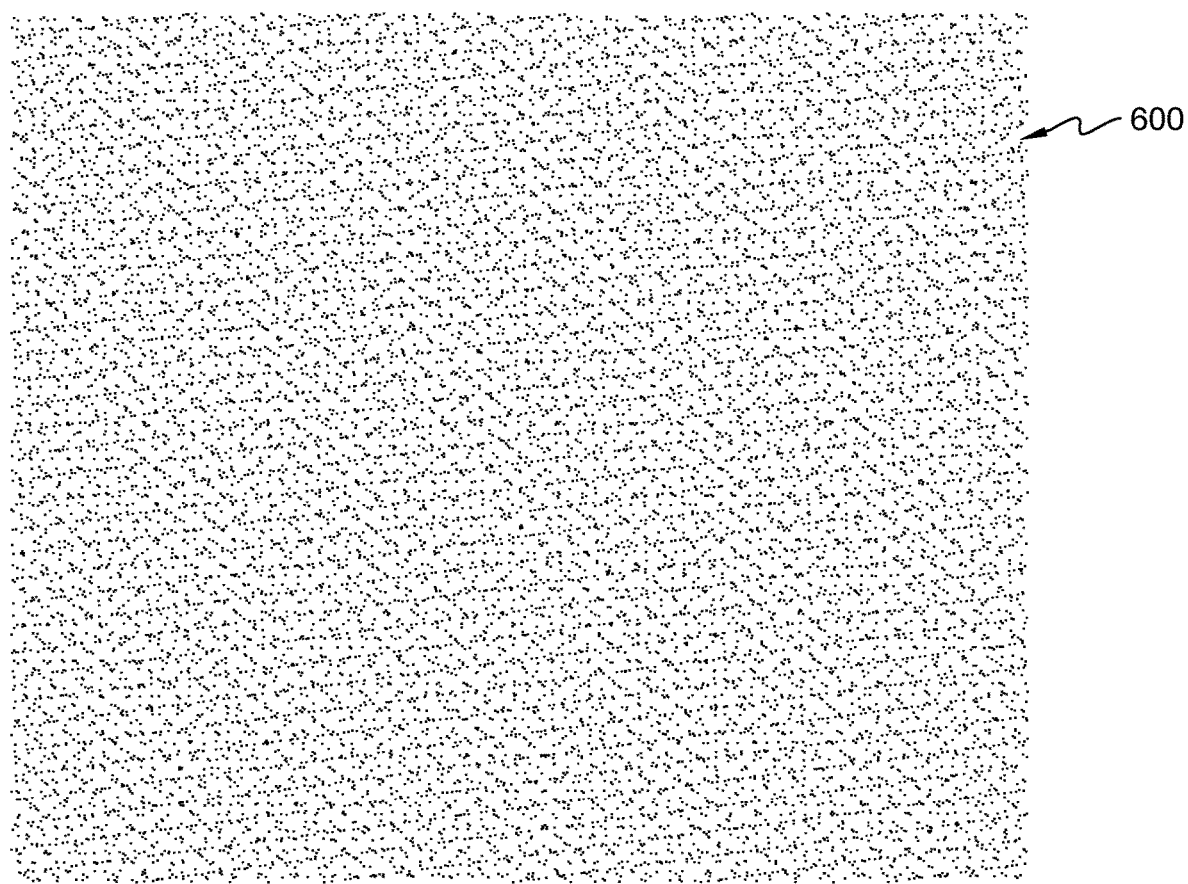
FIG. 4 depicts an image of a phase mask, in accordance with one embodiment of the present invention.
Figure 8:
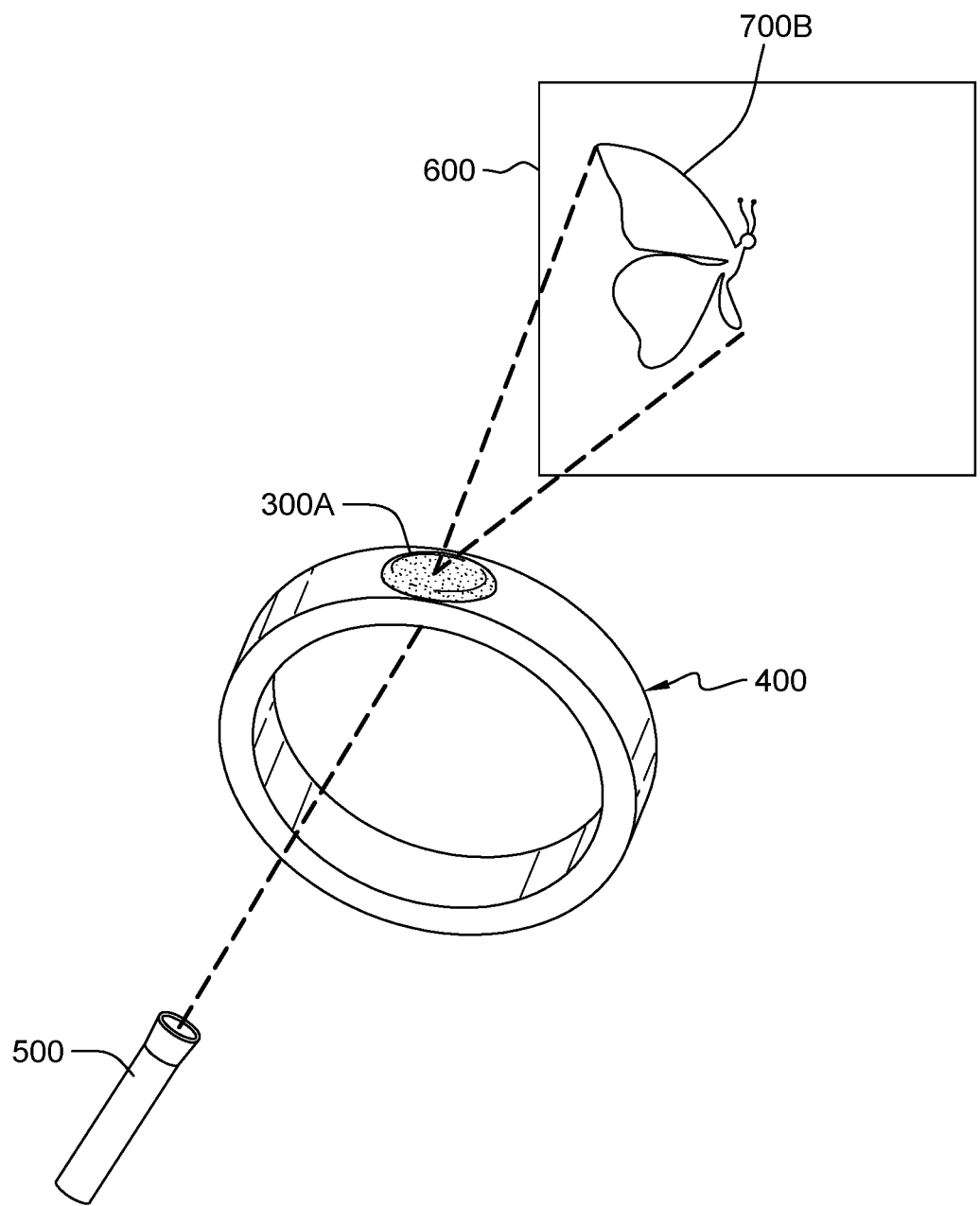
FIG. 8 depicts an embodiment of the appearance of a projection of the image where a non-binary phase mask is etched into the gemstone, in accordance with one embodiment of the present invention.
Figure 9:
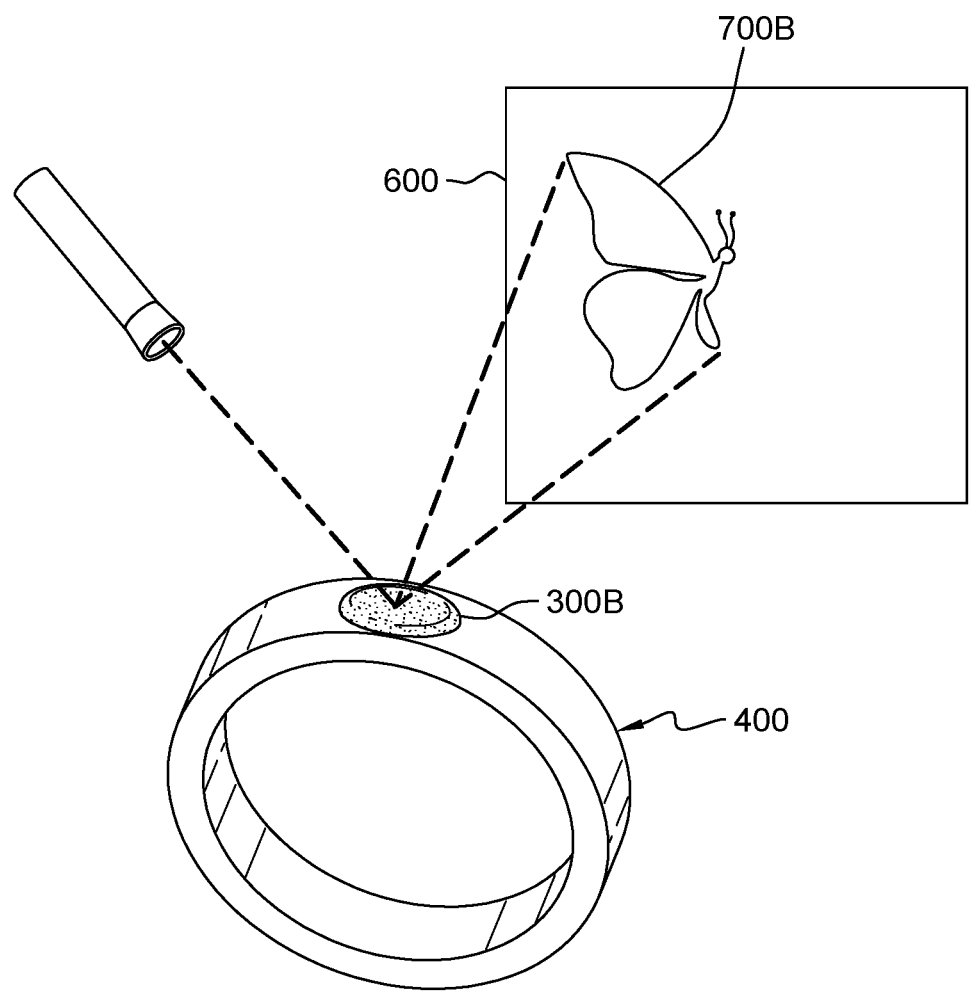
FIG. 9 depicts an embodiment of the appearance of a projection of the image where a non-binary phase mask is etched into the gemstone, in accordance with another embodiment of the present invention.

FIG. 1 depicts a flow chart of the method to embed the image in a gemstone, in accordance with one embodiment of the present invention. The method requires the generating, receiving, or preparing of an image (step 102) to be used in the following steps. For exemplary purposes the image is shown in FIGS. 8-9 as butterfly 700. The image can be, but not limited to any image that has the appropriate resolution and sized based on the gemstone size or phase mask process limitations. The image, once received, is then properly formatted and altered, so that once embedded in the gemstone as a phase mask (binary or non-binary), the image is viewable (at the highest resolution possible) when projected. The projection may be, but not limited to, either shinning a light directly at the gemstone, or looking through the gemstone at a light source. The process of generating the phase mask is explained in detail in FIG. 2. Once the image is converted to the digital phase mask, the digital phase mask of the image is converted to a physical form (step 106). An example of the phase mask is shown in FIG. 4. The physical form of the digital phase mask may be in the form of a lithography, such as electron beam lithography, direct laser lithography, interference lithography, or the like may be used. In some embodiments, the physical form of the phase mask is applied directly to the gemstone through an etching or engraving process. The physical form of the phase mask is embedded into the gemstone (step 108). The embedding of the physical form of the phase mask, is accomplished by known methods to those skilled in the arts to properly etch the gemstone at the predetermined depth, angle, shape, and location. In some embodiments, a first gemstone is etched or engraved with the phase mask, and the first gemstone is embedded in a second gemstone.

Figure 2:
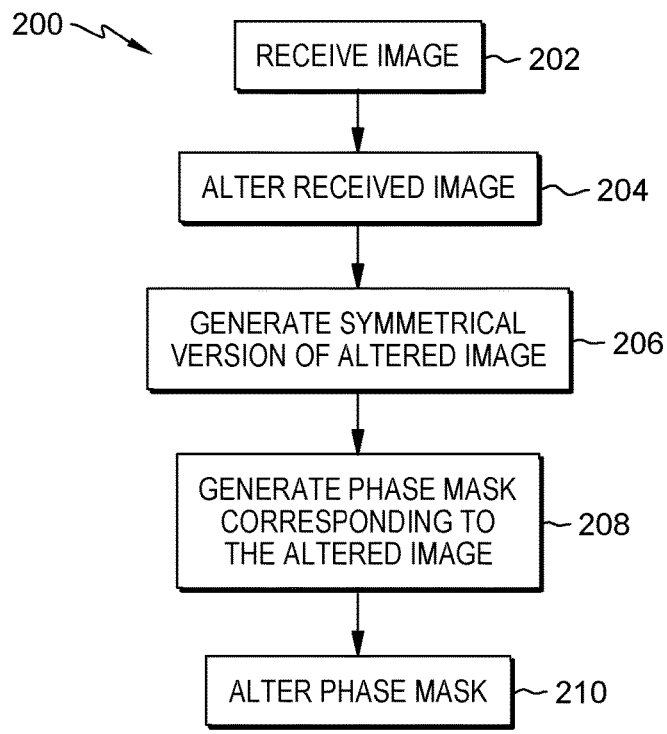
FIG. 2 depicts a flow chart of the method to prepare the image for embedding in the gemstone, in accordance with one embodiment of the present invention.
Figure 6:
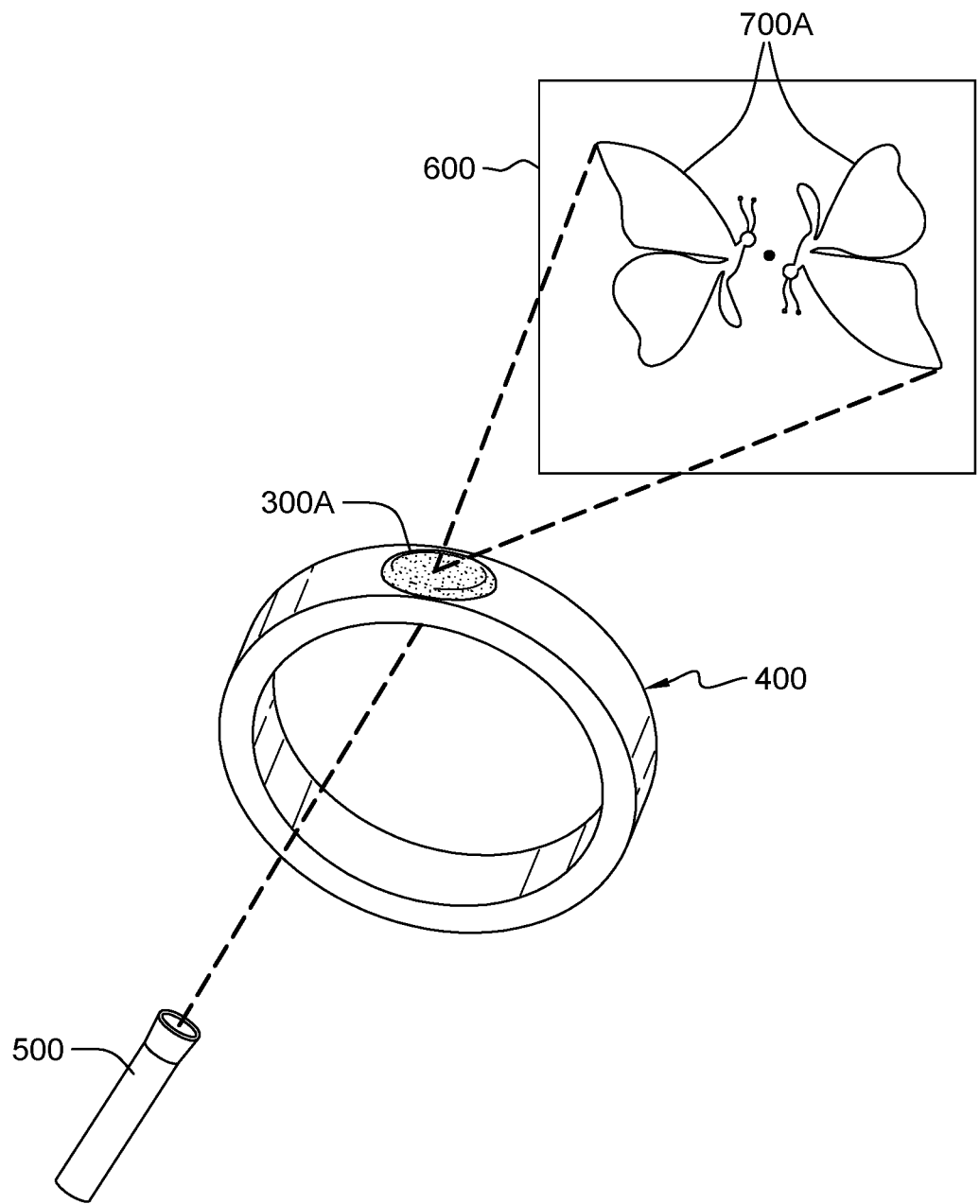
FIG. 6 depicts an embodiment of the appearance of a projection of the image where a binary phase mask is etched into the gemstone, in accordance with one embodiment of the present invention.
Figure 7:
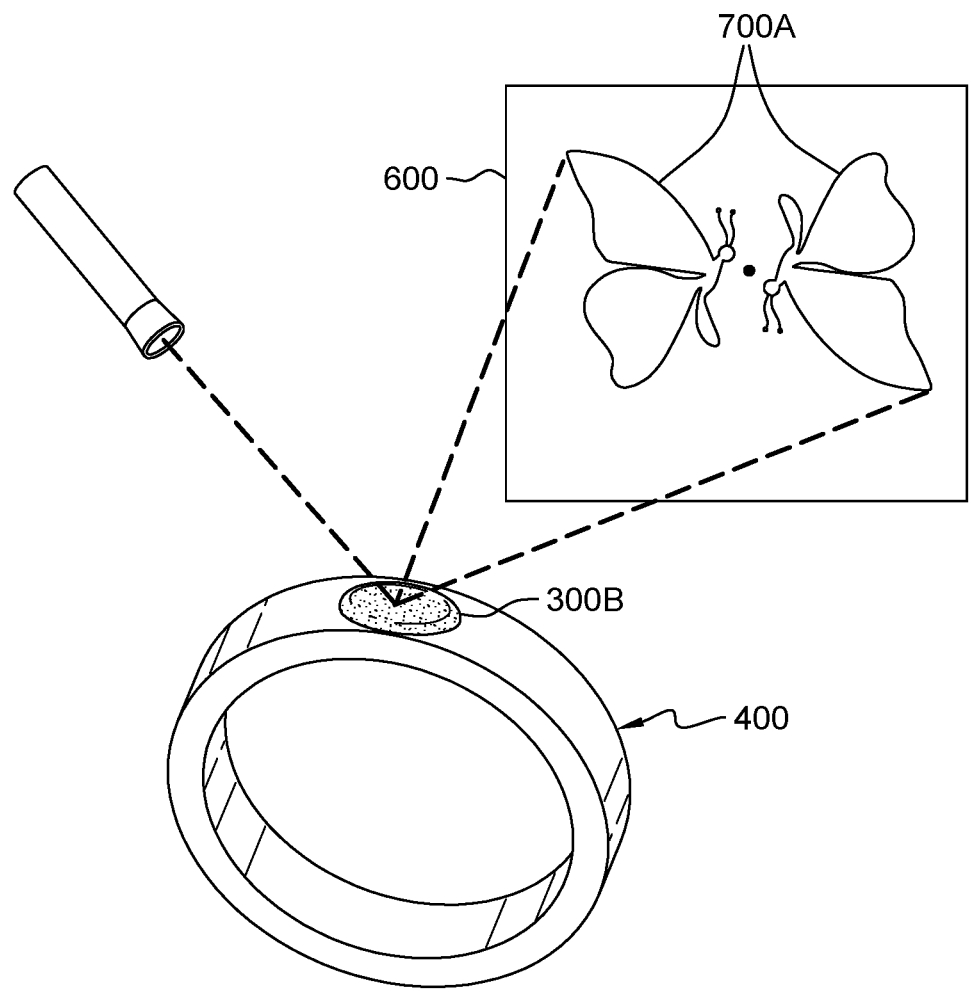
FIG. 7 depicts an embodiment of the appearance of a projection of the image where a binary phase mask is etched into the gemstone, in accordance with another embodiment of the present invention.

FIG. 2 depicts a flow chart of the method to prepare the image for embedding in the gemstone, in accordance with one embodiment of the present invention. The depicted flow chart is for a binary phase mask generation. A non-binary phase mask does not require the mirroring of the image about center. First the image, which is desired to be converted into a phase mask is received (Step 202). In some embodiments, the image might consist of a photograph, a drawing, a work of art, a corporate logo, words, or any other two-dimensional representation of information. In some embodiments, parents might choose photographs of their children. In other embodiments, people might choose images of their loved ones at a special moment. In other embodiments, people might choose images of their pets. Corporations might choose logos relevant to their organizations. In some embodiments, the image could be submitted via a third party (e.g. a website or application), for example a jewelry store that specializes in customized jewelry. In some embodiments, this image has a dimension maximum of 700 pixels by 700 pixels. In additional embodiments, the image dimensions are based on the gemstone type, size, or embedding process. In an additional embodiment, the image may be uploaded via a computer or smartphone to a cloud-connected server. The image is altered (step 204) based on the limitations of the phase mask or the etching process. For example, the edges of the image are blurred to create a circular altered version of the image. The blurring of the edges of the image can be performed in to improve the signal to noise ratio of the resulting projection. The altered image is then reflected about an origin point and a symmetric version of the image about the origin point (step 206) is generated. This is shown in FIGS. 6-7. The generating of the mirrored image about the point of symmetry is required for binary phase masks but is not required for non-binary phase masks, to overcome the twin-image problem that is familiar to those skilled in the art. This symmetric image may be the same dimensions as the original image or may be greater in size. In one embodiment, the original symmetric image is 1400 pixels×1400 pixels. This resolution is preferred for a binary phase mask to retain the proper resolution when creating the binary phase mask. Non-binary phase masks are able to maintain proper resolution at smaller sizes. The high resolution of the image provides optimal data for the generation of the phase mask. If the etching is altered from binary (two depths) to greater than two etch depths, the symmetric image is not necessary, and a single image can be used as the basis for the phase mask etching.

The image (either symmetric able a point or single image if the etching has more than two depths) is then processed (step 208) through various algorithms to generate a phase array corresponding to the image. In one embodiment, a Gerchberg-Saxton algorithm is used and a large number of iterations of the image using the algorithm is performed.

The phase mask can be created in either a binary or non-binary design. In one embodiment, the binary phase mask is then converted into a physical mask via a lithographic process, with unaltered surface corresponding to a 0-phase shift, and an altered surface corresponding to a π phase-shifting. The depth of the altered surface is optimized for the refractive index of the material and the wavelength of light used to project the image. For example, for a wavelength of 532 nm green light in air, passing through sapphire of refractive index 1.77, a π phase shift corresponds to a height of:

$$H = nh = n\lambda \frac{\pi}{2\pi} = 1/(1.77-1)532 \text{ nm}(1/2) = 345 \text{ nm}$$

In additional embodiments, the depth is calculated using the material refractive index and the light wavelength to determine the depth of the altered phase shifting surface.

At the conclusion of the iterations, a Fourier analysis of each pixel of the image is represented by a phase between 0 and 2π, thereby generating the digital phase mask of the image. The digital phase mask provides a high-fidelity representation of the initial image when Fourier-transformed. Alternately, a Fresnel transformation accounting for the scattering surface distance of subsequent projection can be used. In some embodiments, the etched phase mask has been stretched along one axis to account for the optical properties of reflection at an angle, such that the image on the scattering surface appears relatively unstretched. For a binary phase mask all the pixels are then numerically rounded, wherein a value that is less than π is rounded to 0, and values greater than π is rounded to π. This results in the digital phase map of the image being converted to a binary phase mask, resulting in a binary phase map of either 0 or π. In additional embodiments, the phases of all the pixels are not rounded and are used to create a phase mask of a multitude of potential values.

In one embodiment, the method is an iterative method, similar to the Gerchberg-Saxton algorithm. An initial image $I0(x,y)$ is used as the intensity, with the phase set to zero for the first iteration. The Fourier transform is obtained. Each pixel has an amplitude and phase. The amplitude $I^*(x,y)$ is discarded. The phase $phi^*(x,y)$ is combined with the amplitude from an image of the laser beam intensity profile $I1^*(x)$. For example, if the laser is a Gaussian, then a two-dimensional Gaussian is used as image $I1^*(x,y)$. The 2D array of complex numbers is inverse Fourier transformed, and the amplitude array $I(x,y)$ is again discarded. The phase array $phi\_N(x,y)$ is either taken as the final phase array or used as the input to the algorithm for another iteration. More iterations typically result in a higher fidelity representation of the initial image. In an embodiment, one hundred (100) iterations provides a high-resolution phase mask. More or less iterations may be performed based on the original image, or other factors. Finally, in the case of a binary phase array, the phase array $phi\_N(x,y)$ is binarized.

In one embodiment, a lithographic process is used to two-dimensionally pattern photoresist onto a 2-inch diameter gemstone of thickness 0.4 mm using a Heidelberg MLA150 Direct Write Lithographer. In this embodiment, multiple phase-masks can be rapidly patterned onto a wafer, making the process suitable for mass-production. A digital phase mask is etched into the gemstone using an inductively coupled plasma etch process. In some embodiments, the digital phase mask, etched patches of 345 nm depth are the phase shift pixels, and unetched patches are 0 nm depth. A small 2.5 mm diameter piece of the larger gemstone is removed from the larger wafer using a laser cutting process, such as, but not limited to a Rofin StarMark Performance II Nd:YAG laser scribe tool. Alternately, the small diameter piece could be removed using mechanical cutting tools, other scribe tools, deep etching, hydraulic cutting, powder-blasting, or other means familiar to those skilled in the art. Alternatively, the 2.5 mm disk could be the starting material, and the lithographic pattern placed directly onto the disk. The 2.5 mm diameter etched gemstone is then placed into a piece of jewelry, such as a ring made of metal such as gold, platinum, silver, or other metals, ceramics, plastics, and other materials. Various pieces of metal may be soldered together to partially envelop the gemstone, for example using laser welding or other means familiar to those skilled in the art. Alternately, the gemstone could be mounted using a bezel or set of the type familiar to those skilled in the art. In various embodiments, the jewelry body can be an engagement ring, a wedding ring, a necklace, wristband, bangle, or other wearable jewelry. Alternatively, the jewelry body can be a small attachment to an existing piece of jewelry, for example a small metal bezel mount that can be soldered to an existing ring. Alternately, the jewelry body can be for display purposes only, such as a display case.

Figure 3:
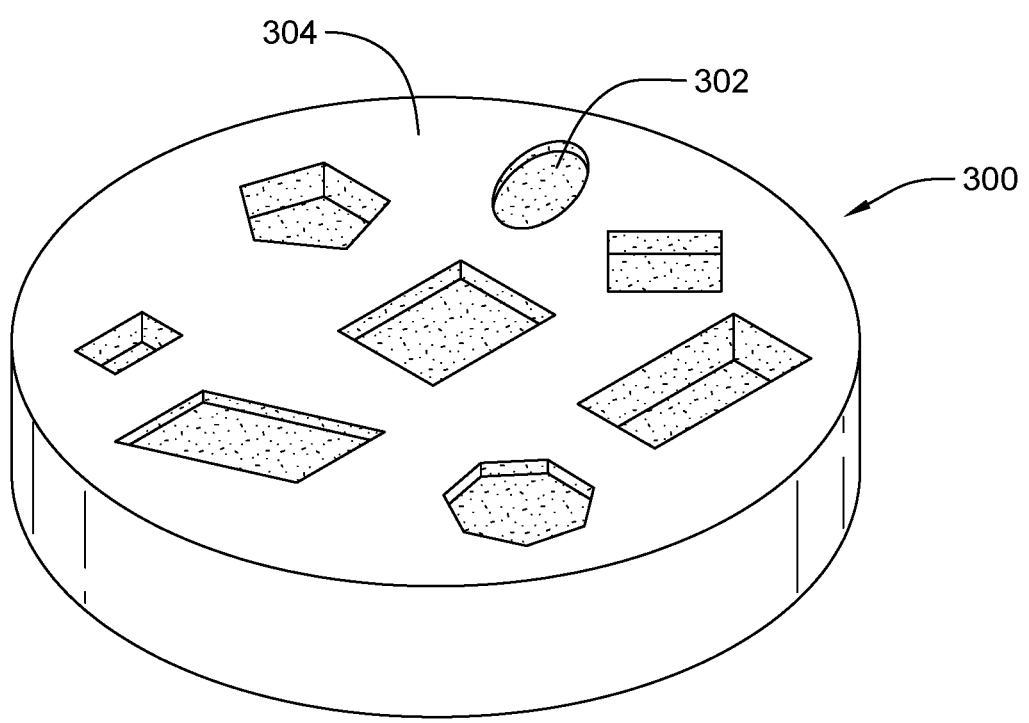
FIG. 3 depicts an image of a surface of the gemstone, in accordance with one embodiment of the present invention.

FIG. 3 depicts the surface of the gemstone 300, in accordance with one embodiment of the present invention. The depicted embodiment of the gemstone 300 shows an exaggerated (for viewing purposes) view of the etchings 302 on the surface 304 of the gemstone 300. The gemstone surface 304 has either etched areas 302 or non-etched areas. The etched areas 302 are based on the phase mask, and therefore the etched areas 302 may have various depths, angles, pitches, shapes, or features based on the phase mask (FIG. 4).

FIG. 4 depicts an image of a phase mask 700, in accordance with one embodiment of the present invention. The phase mask 700 when viewed directly does not provide a clear view of the original image. The phase mask 700 requires the light source of a specific wavelength to properly interact with the phase mask 700 to procedure the original image. If a different wavelength of light is used, the relative intensity of the zero-th order spot (central bright dot that corresponds with undiffracted light) will become greater as compared to the diffracted images. Temporally coherent light such as that from a laser is preferred, to avoid blurring of the resulting projected image. The depicted embodiment, shows the areas where the phase mask has a value of zero (white space) and a value greater than zero (black dots).

FIGS. 5-8 depicts an embodiment of the gemstone 300 integrated into a jewelry body 400, in accordance with embodiments of the present invention. The jewelry body 400 may be a variety of bodies or frames that are able to support the gemstone 300. The depicted embodiment of the jewelry body 400 is that of a ring, which would be worn on a person's finger. In the depicted embodiment, the jewelry body 400 is a ring. In additional embodiments, the jewelry body 400 is various frames or structures that can support and protect the gemstone 300. To view the projection 700, a laser or light source 500 is pointed at the gemstone 300A (300B) at a predetermined angle based on the phase mask embedded in the gemstone 300A (300B). As a light beam passes through the gemstone 300A, the phase mask affects the lights passage by means of a diffractive interference pattern familiar to those skilled in the art, resulting in a projection 700 being projected onto an optically scattering surface 600. The optically scattering surface 600 is preferentially an optically reflective and scattering surface such as a painted white wall. In some embodiments, the gemstone 300A or 300B needs to be a certain distance from the surface to provide for a clear projection 700. In other embodiments, the light source's 500 intensity and concentration may affect the distance from the surface 600 the gemstone 300A (300B) needs to be located. In alternative arrangement, the gemstone can be held up relatively close to the person's eye or a camera, and a laser-spot is directed in front of the gemstone 300A. Looking through the gemstone 300A at a laser spot on a wall, the projection 700A (700B) appears, and float in the air. In this case, the image is being projected onto the retina.

The pitch, phase mask size, and light source 500 wavelength determine the angular size of the projection 700. Combined with the distance to the surface 600 this determines the size of the projection 700. The wavelength of the light source 500 is a factor in determining the phase pitch and depth. For example, if the phases are not exactly 0 or pi (e.g if etching is ⅞ pi), the resulting projection will divert less optical power to the diffraction projected images, resulting in weaker (lower resolution) projection 700 and a stronger zeroth order beam (the bright spot in the middle). This is the reason why using a light source 500 with one wavelength (e.g. red laser pointer) for an etched phase mask designed for a light source 500 with a different wavelength (e.g. green laser pointer) will still work. However, the resolution will be lower.

In one embodiment, a Gaussian intensity green laser beam 500 is used to generate the projection 700. The resulting projection 700 corresponds to the Fourier transform of the Gaussian laser beam phase-shifted by the embedded phase mask in the gemstone 300. Due to the iterative phase-retrieval algorithm used, the projection 700 corresponds to a likeness of the original image.

FIGS. 7 and 9 depicts embodiments of a non-transparent gemstone 300 integrated into a jewelry body 400 and the method of generating the projection 700A (700B), in accordance with one embodiment of the present invention. At least one surface of the gemstone 300B is not optically transparent. Instead, at least one surface of the gemstone 300B is optically reflective. This can be accomplished, for example, by means of etching the phase mask into an optically reflective material such as gold, silver, platinum, or the like which have reflective properties. Alternately, this can be accomplished by coating an optically transparent material such as gemstone 300B with an optically reflective layer such as platinum. A metal coating may be applied to the etched phase mask, such that light passes through one optically transparent surface of the gemstone 300B, reflects off said metal-coated phase-array, and then passes through the optically transparent surface a second time. When a light source 500 illuminates the phase mask, the projection 700A (700B) is projected onto a surface 600. Whether the gemstone 300B is used transmission or reflection, as well as the angle of reflection, affects the calculation to determine the etching of the gemstone 300B so that the pitch and depth of the each phase is correct to properly generate the projection 700A (700B).

FIGS. 6 and 7 depict projection 700A, where the original image is mirrored about a point of symmetry. This is typical in the binary phase mask. The phase mask must therefore have multiple phases to allow for a breaking of the symmetry. FIGS. 8 and 9 depict projection 700B, where the original image is not mirrored about a point of symmetry. This is permissible in non-binary phase masks. The non-binary phase mask may have multiple phases to allow for breaking of the symmetry. Thus, different features of the image are etched at varying depth. For example, four different etching depths are used, e.g. 0 nm, 172 nm, 345 nm, 517 nm into the gemstone 300A or 300B (of refractive index 1.77), and a light source 300 (wavelength 532 nm) resulting in a 4-phase mask rather than a binary phase mask. The 4-phase mask has numerous advantages over binary phase mask such as the possibility to project asymmetric images, and a closer apparent likeness in the projection due to the additional degrees of freedom afforded by the multiple phases. The phase-masks can further be optimized for multi-color projection, for example resulting from a combined red, green, and blue laser.

Figure 5:
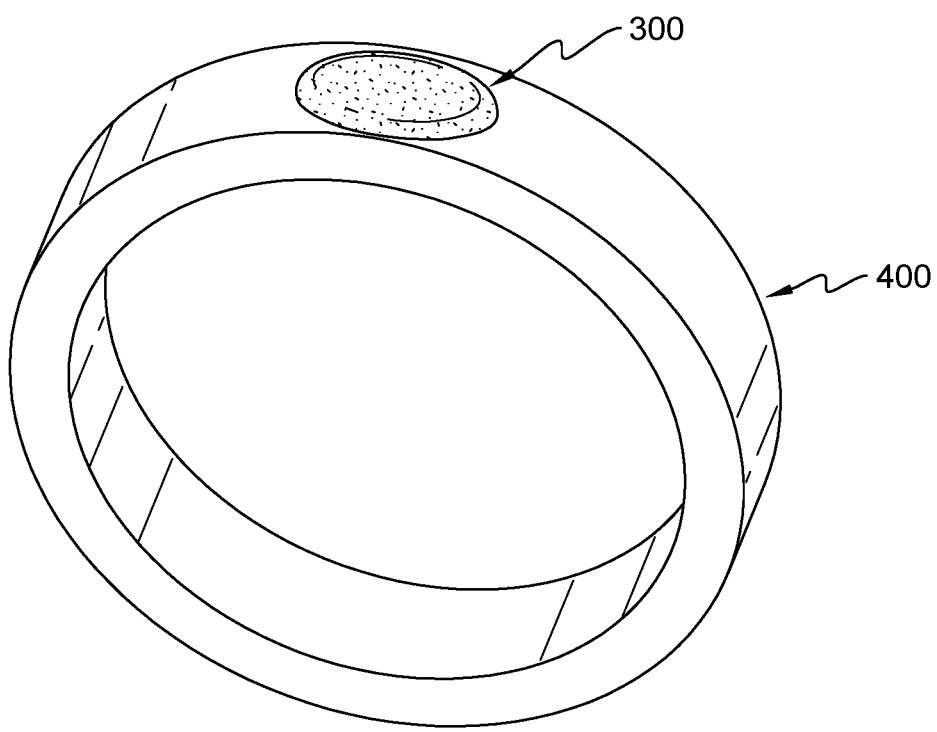
FIG. 5 depicts an image of an article of jewelry with the gemstone, in accordance with one embodiment of the present invention.

FIG. 5 depicts an embodiment of an optically transparent gemstone 300A integrated into a jewelry body 400, in accordance with another embodiment of the present invention. The gemstone 300A is a transparent material. In the depicted embodiment, the gemstone 300A with the phase mask has a light source 500 shining through the gemstone 300A. In additional embodiments, the orientation of the gemstone 300A with respect to a jewelry body 400, such that the phase mask can be illuminated without removing the jewelry body 400. The gemstone 300A, maybe, but not limited to, a diamond, glass, a polymer, or other solid material with a refractive index sufficiently different from that of air.

The present invention can be used in an alternative embodiment, where a person places the gemstone 300A near their eye and looks through the gemstone 300A (thereby looking through the phase mask), and the projection is visible to the person and the image becomes visible In another embodiment, the phase mask may be embedded into the gemstone 300A (optically transparent material), which is then embedded within another gemstone. For example, the gemstone 300A could be bonded to another gemstone substrate such that the phase mask cannot be damaged by mechanical abrasion such as scratching. In additional embodiments, a coating is applied to the etched surface of the gemstone 300 with the phase mask to protect the phase mask from damage. The gemstone may optionally be coated with anti-reflection coating to enhance transmission efficiency and reduce optical losses at interfaces.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A method of creating a jewelry article that can project an image, comprising:
   creating a two-dimensional phase-mask, comprising converting an image to a non-binary phase mask, converting the non-binary phase mask to a physical phase mask, wherein the physical phase mask is the two-dimensional phase mask;
   etching the two-dimensional phase mask on a decorative element;
   securing the decorative element within a frame;
   causing a light source to interact with the decorative element, whereby an image is projected on to a surface.

2. The method of creating a jewelry article of claim 1, further comprising, performing a plurality of iterations on the image to generate a phase array, wherein phases of the phase array are represented between 0 and $2\pi$.

3. The method of creating a jewelry article of claim 2, further comprising adjusting, each phase to a value of 0 or $\pi$, so as to create a binary phase mask that approximates the non-binary phase mask.

4. The method of creating a jewelry article of claim 2, wherein the depth and pitch of the etched sections of the decorative element is based on the refractive index of the decorative element and a wavelength of a light source.

5. The method of creating a jewelry article of claim 1, wherein the image is reflected about a point of symmetry to create a symmetrical image prior to converting the image to a non-binary phase mask.

6. The method of creating a jewelry article of claim 5, wherein the etching of the two-dimensional phase mask on the decorative element comprising a lithographic process, wherein a plurality of sections of a surface of the decorative element are etched, and plurality of sections of the surface of the decorative element are unaltered.

* * * * *